Aug. 30, 1966   J. PICKLES   3,269,687
ADJUSTABLE SEAT CONSTRUCTION
Filed Sept. 28, 1964   3 Sheets-Sheet 1
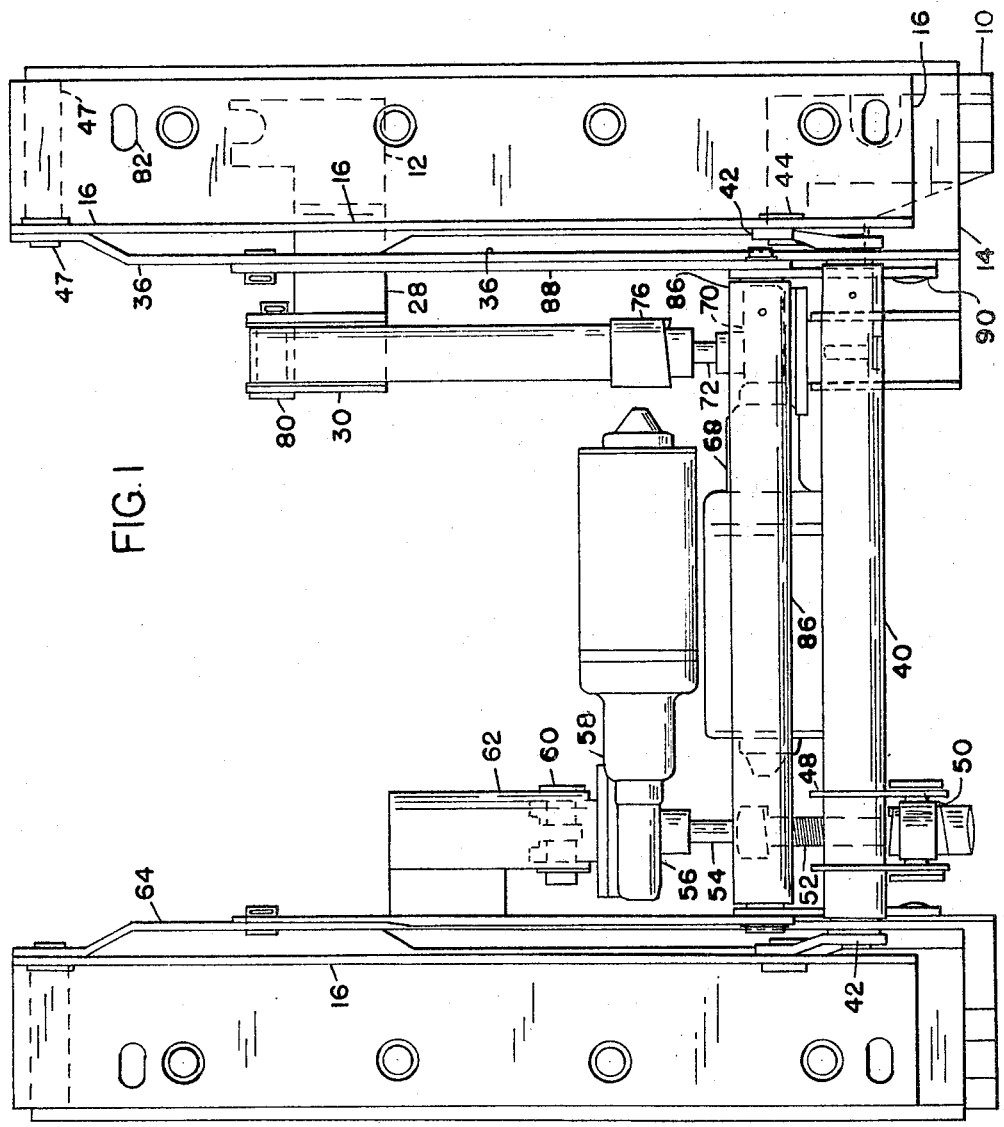
INVENTOR.
JOSEPH PICKLES
BY *Whittemore*
*Hulbert & Belknap*
ATTORNEYS

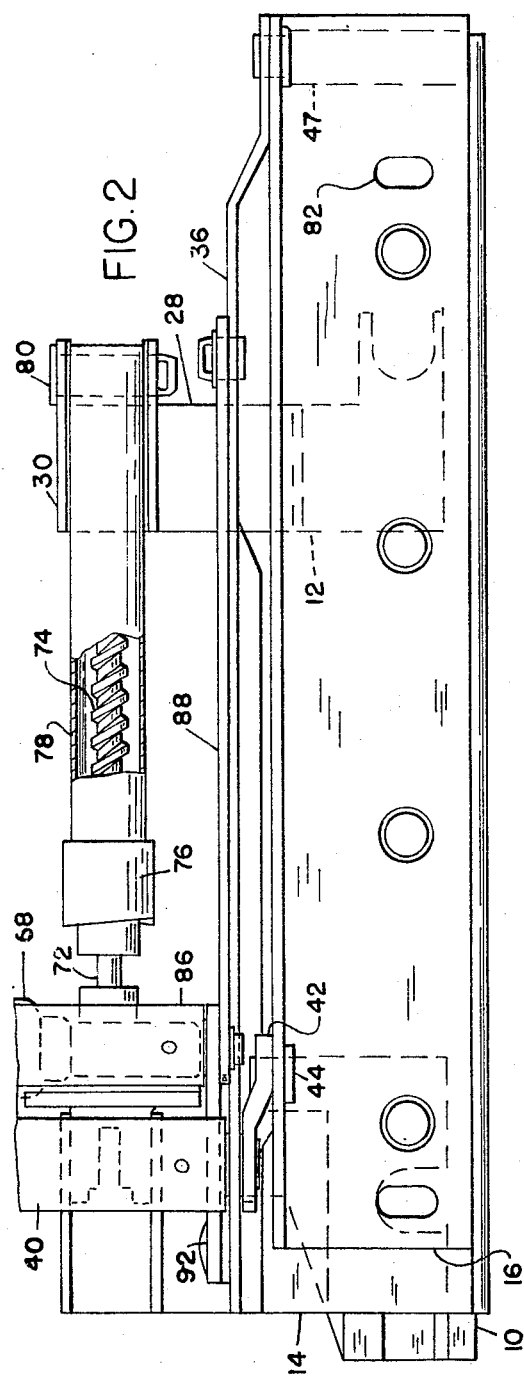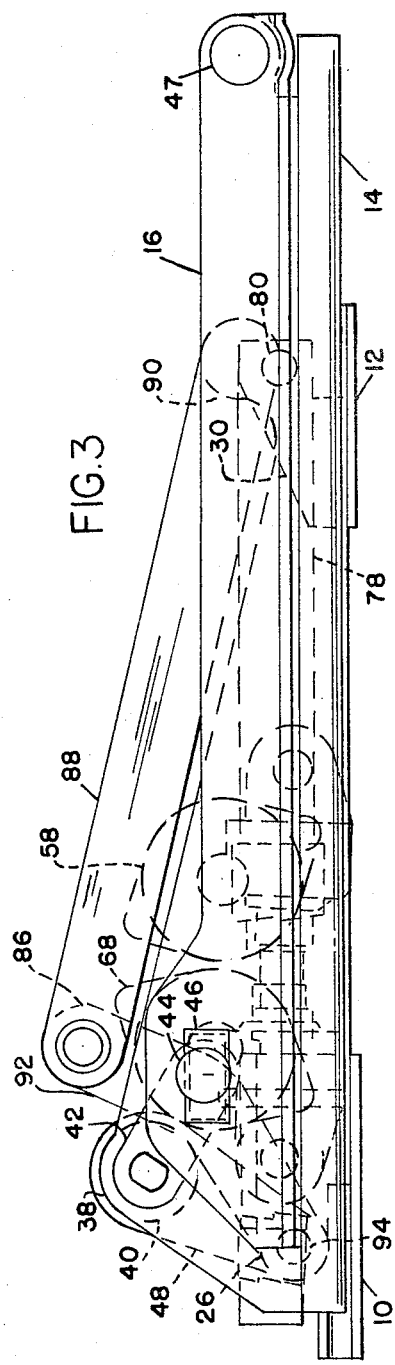

Aug. 30, 1966    J. PICKLES    3,269,687
ADJUSTABLE SEAT CONSTRUCTION

Filed Sept. 28, 1964    3 Sheets-Sheet 3

INVENTOR.
JOSEPH PICKLES
BY *Whittemore*
*Hulbert & Belknap*
ATTORNEYS

United States Patent Office 3,269,687
Patented August 30, 1966

3,269,687
ADJUSTABLE SEAT CONSTRUCTION
Joseph Pickles, Dearborn, Mich., assignor to Ferro Manufacturing Corporation, a corporation of Michigan
Filed Sept. 28, 1964, Ser. No. 399,570
5 Claims. (Cl. 248—397)

The present invention relates to an adjustable seat construction, and more particularly, to a power operated vehicle seat designed particularly for use with individual bucket seats.

It is an object of the present invention to provide a vehicle seat capable of being tilted and being moved horizontally, including separate motor drive devices connected to the mechanism for selectively effecting the adjustment.

It is a further object of the present invention to provide a construction of the character described which comprises stationary track elements, slides movable on the track elements, and seat frame support members pivoted for tilting adjustment on the slides, and a pair of actuating motors for effecting tilting and horizontal adjustment carried by said horizontally movable slides.

It is a further object of the present invention to provide a seat construction as described in the previous paragraph in which similar adjustable seat supporting structures are provided for attachment to opposite ends of a vehicle seat and a pair of torque bars interconnecting said structures.

It is a further object of the present invention to provide seat supporting mechanism comprising a horizontally movable slide, a seat frame supporting element pivoted adjacent its rear end to said slide, a lift lever pivoted to said slide adjacent its forward end and being connected to said seat frame supporting element by means including an elongated pin and slot connection.

Other objects and features of the invention will become apparent as the description proceeds, especially when taken in conjunction with the accompanying drawings, illustrating a preferred embodiment of the invention, wherein:

FIGURE 1 is a plan view of the seat support structure on a very much reduced scale.

FIGURE 2 is a fragmentary plan elevation with parts broken away, of the left side of a seat supporting structure.

FIGURE 3 is a side elevation of the structure shown in FIGURE 2.

Figure 4:
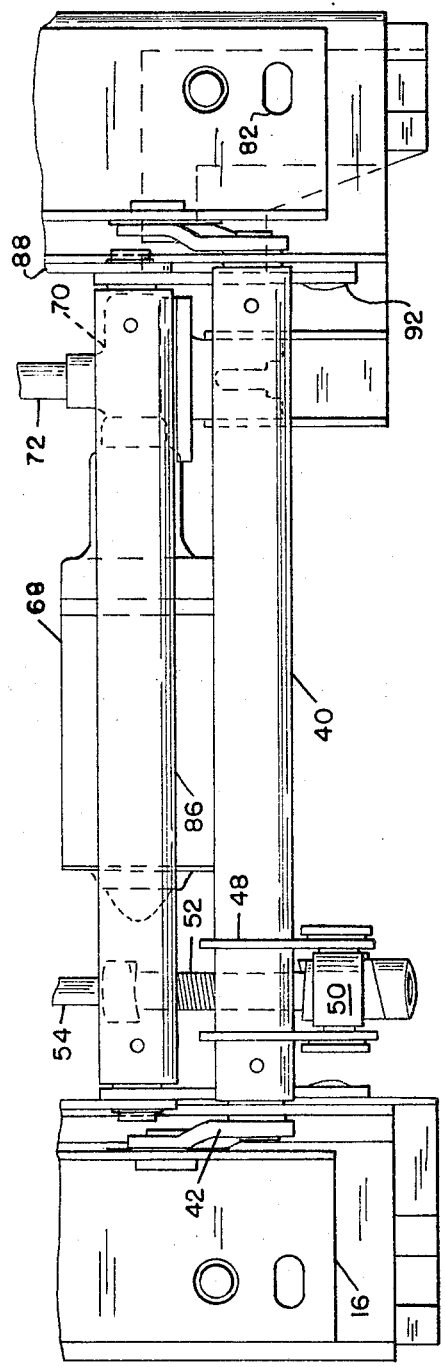
FIGURE 4 is a fragmentary plan view of the front end of the seat supporting structure.

Referring now to the drawings, the seat supporting structure comprises a pair of substantially similar devices adapted to be connected between each end of a vehicle seat frame and the floor of the vehicle. These devices are interconnected by torque bars so that forces applied to one of such devices are applied equally to the other device and hence will prevent binding.

In detail, each of the devices comprises a front track member 10 and a rear track member 12 on which a slide 14 is mounted for substantially horizontal movement. Pivoted to the rear end of the slide is a seat supporting frame bar 16. From the foregoing it will be apparent that a seat supported at opposite ends by one of the devices is movable generally horizontally between front and rear positions and may also be tilted, specifically, by having its front edge movable substantially vertically while its rear edge remains at a constant height.

Figure 5:
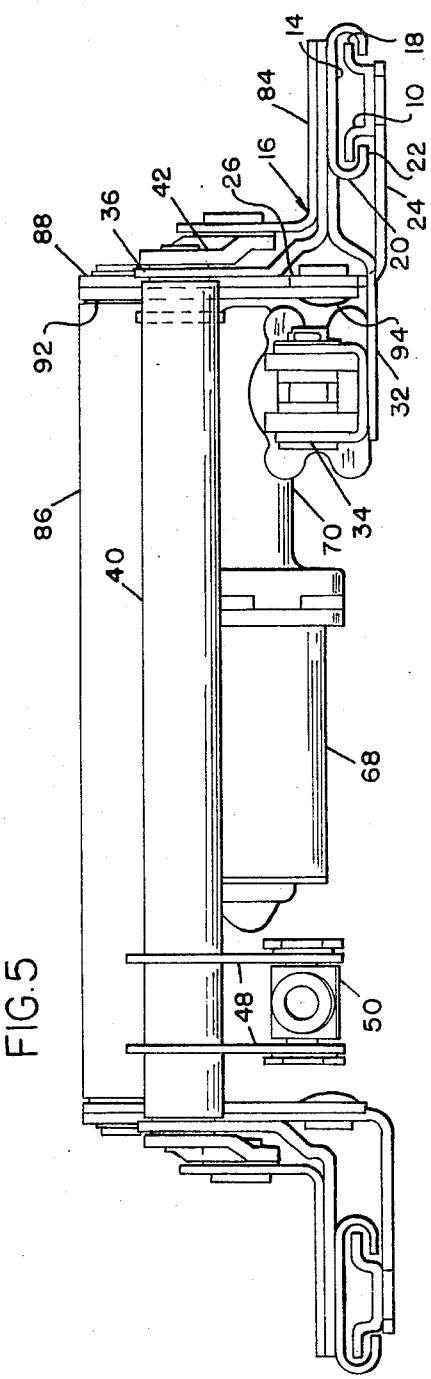
FIGURE 5 is a front elevational view of the seat supporting structure.

As best seen in FIGURE 5, the track elements, and particularly the front track element 10, includes a pair of laterally extending ears 18 and the slide includes an inverted channel 20 having inturned edges 22 which underlie the flanges or ears 18. The arrangement is similar between the slide and the rear track element 12. The front track element 10 has welded or otherwise rigidly secured thereto a laterally inwardly extending portion 24, terminating in an upwardly extending flange 26 which provides a stationary pivot support for mechanism later to be described.

Similarly, the rear track element 12 includes an inwardly extending portion 28 to which is connected an upwardly open U-shaped bracket 30 constituting a fixed pivot support for mechanism later to be described.

The elongated slide 14, as best seen in FIGURE 5, comprises a lower member 32 at the front thereof to which is secured an upwardly extending U-shaped bracket 34 to provide a pivot mounting movable with the slide for connection to mechanism later to be described.

The slide 14 also includes an upwardly extending flange portion 36 which adjacent the front of the device includes an upwardly extending ear 38 apertured to receive a transversely extending torque bar 40. Fixedly secured to the outer ends of the torque bar 40 are lift arms 42 which at their outer ends include pins 44 movable in elongated slots 46 provided adjacent the forward end of the frame bars 16. Frame bars 16 are pivoted adjacent their rear ends to the upstanding flange portions 36 at the rear ends of the slides 14 by suitable means such as pivot pins 47 passing through the flange portions 36 and the upstanding flanges of the bars 16. Means are provided for rotating the torque bar 40 and this means comprises a pair of arms 48 fixedly secured to the torque bar 40 between which is pivoted a nut 50 which receives an actuating screw 52 connected to a shaft 54 driven through gearing contained in a gear box 56 by a motor 58. The motor 58 is fixedly secured to the gear box 56, which in turn is pivotally connected by pivot means indicated at 60 to a bracket 62 fixedly secured to and extending inwardly from the right hand slide 64. It will be apparent that when the motor 58 is energized it will rotate the torque bar 40 in one direction or the other and will thus lift or lower the forward ends of the seat frame support bar 16 through the pin and slot connection afforded by the pin 44 and slot 46.

Since the lifting effort derives from rotation of the torque bar 40 and is transmitted equally to lift arms 42 at opposite ends thereof, the forward edge of the seat on the support bars 16 is movable freely in a substantially vertical direction without any tendency to bind irrespective of irregularities in loading of the seat.

Similarly, horizontal movement of the seat in a substantially fore and aft direction is accomplished from a motor 68. This motor is fixedly connected to a transmission housing 70 which includes gearing driving a shaft 72 which in turn is connected to a threaded shaft or screw 74 extending through a nut 76. The transmission housing 70 is connected to the U-shaped bracket 34 as best seen in FIGURE 5. Connected to the nut 76 is a tubular sleeve 78 which houses the screw 74, the rear end of the sleeve being connected to the stationary U-shaped bracket 30 carried by the rear slide 12, as indicated at 80 in FIGURE 2. Accordingly, as the motor 68 is energized in either direction the screw 74 is turned under since the nut 76 is retained in a stationary position by the sleeve 78, the slide 14 is moved horizontally on the track elements 10 and 12.

As best seen in FIGURE 5, the seat frame support bars 16 are generally L-shaped in cross-section, have generally horizontal webs or flanges 84, upstanding or generally vertical flanges at the inner edges of the webs or flanges 84, the latter being provided with elongated openings 82, seen in FIGURE 2, by means of which a seat frame is bolted to the frame support bars. When the forward end of the seat is in lowered position a horizontal bottom flange 84 of the bars rests against the upper flat surface of the slide 14. It will be observed that the overall height occupied by the track elements, the slide and the horizontal flange of the frame bars is a minimum.

In order to insure free horizontal movement of a seat upon actuation of the motor 68, means including a torque bar 86 is provided. The torque bar 86 is carried at opposite ends by a pair of links 88 which at their rear ends are pivoted to upwardly extending portions 90 of the flange 36 provided at the inner edge of the slide 14. Fixedly secured to the torque bar 86 at opposite ends are a pair of rigid angularly bent arms or links 92. The lower ends of these arms or links 92 are pivoted as indicated at 94 to the upwardly extending flanges 26 of the front track member 10.

When the motor 68 is energized so as to effect horizontal movement of the slide 14, this movement through the links 88 and 92 will cause rotation of the torque bar 86 which thus serves to insure equal movement of the slide 14 at opposite ends of the seat.

As is best apparent in FIGURE 5, the slide structure including parts 10 and 14 is directly adjacent the floor, while the bar 40 is located at a relatively great distance above the slides. The bar serves as a compression member and retains the upright flange portions of the slides and frame bars against inward collapse. There is thus provided a very compact construction exhibiting high rigidity.

From the foregoing description the operation of the adjustable seat supporting construction is believed clearly evident. Attention is particularly directed to the compactness of the structure which provides the two actuating motors in side-by-side relation under the individual seats and which permits the individual bucket seats to receive all of the operating mechanism within its hollow interior while the edge portions of the seat itself are attached to the horizontal flange portions 84 of the seat support bars. This permits extremely low profile to be maintained.

The construction is designed particularly for use with bucket seats which are commonly used in sport cars where it is desirable to maintain a low profile. The construction is characterized particularly by its economy of operation and affords individual power adjustment of bucket seats in a most efficient manner.

From the detailed description set forth above it will be apparent that the low profile of the construction is attributable largely to the specific design of the elements, principally the track structure, the slide structure, and the seat support structure. Thus, the slide structure including members 10 and 12, is itself of low profile and is adapted to be secured directly to the floor of the vehicle. The slide structure indicated generally at 14 is basically of L-shaped cross-section having a substantially horizontal flange portion overlying the track structure and the generally upwardly extending or upright flange portion 36. The seat support bars, also of generally L-shaped cross-section, include the generally horizontal flange portions 84 which in the lowered position of the seat are adapted to rest on the horizontal flange portions of the slides. In addition, the seat support bars 84 are provided at their inner edges with upwardly extending or upstanding flange portions 16, adapted to extend generally in parallelism with the upstanding flange portions 36 provided at the inner edges of the slides 14. Since the side edges of the seat are adapted to be secured to the generally horizontal flanges 84 of the seat support bars, and the operating mechanism including the torque bars 40 and 86 and the motors 58 and 68 are adapted to be received within the hollow interior of the seat structure, the objects of the invention are attained.

The drawings and the foregoing specification constitute a description of the improved adjustable seat construction in such full, clear, concise and exact terms as to enable any person skilled in the art to practice the invention, the scope of which is indicated by the appended claims.

What I claim as my invention is:

1. Adjustable seat supporting structure for a bucket seat comprising a pair of tracks adapted to be attached to the floor of a vehicle to underlie an individual bucket seat at opposite sides thereof, elongated slides movable longitudinally on said tracks, said slides being of generally L-shaped cross-section and comprising horizontal flanges closely adjacent the upper portion of said track and vertically extending flanges at the inner edges of said horizontal flanges, seat frame supporting bars of generally L-shaped cross-section comprising horizontal flanges adapted in lowered position to engage the horizontal flanges of said slides and including at their inner edges vertically extending flanges, pivot means interconnecting the vertically extending flanges of said slides and frame bars adjacent the rear ends thereof.

2. Adjustable seat support structure for a bucket seat comprising a pair of tracks adapted to be secured to the floor of a vehicle, a pair of elongated slides movable longitudinally on said tracks, each of said slides being of generally L-shaped cross-section and having a horizontal flange closely spaced above the top of its cooperating track and an inner upstanding flange, an elongated seat support bar also of generally L-shaped cross-section overlying each of said slides and pivotally connected thereto at its rear end, said seat support bars including horizontal flanges adapted to rest upon the horizontal flanges of said slides when said seat support bars are in lowered position, said seat support bars including upstanding flanges at their inner edges, the pivot connection between said slides and said seat support bars being provided between the upstanding flanges thereof.

3. Structure as defined in claim 2 which comprises a torque bar pivoted to and extending between the upstanding flanges on said slides, and means providing abutments between said torque bar and said flanges to cause said bar to act as a compression member preventing inward collapse of said flanges under load.

4. A seat supporting mechanism designed particularly for bucket seats comprising a pair of longitudinally extending tracks each of which comprises a center web and laterally extending ears spaced slightly above the center web, slides mounted on said tracks comprising central web portions overlying said tracks, and downwardly and inwardly extending ear portions underlying the ears of said tracks, said slides being of generally L-shaped cross-section and including horizontal flange portions provided at their inner edges with upstanding flange portions, seat frame supporting bars also of generally L-shaped cross-section having horizontal flange portions and upwardly extending flange portions at the inner edges of said horizontal flange portions, pivot connections between the upstanding flange portions of said slides and said bars adjacent the rear ends thereof, a first torque bar extending transversely between said slides and mounted on the upwardly extending flange portions thereof for rotation, lift levers at opposite ends of said torque bar, lost motion connections between said lift levers and the forward ends of said seat frame support bars, a motor and transmission unit mounted on one of said slides for movement therewith, an actuating connection between said unit and said torque bar including an arm fixedly secured to said torque bar, a second motor and transmission housing unit mounted on the other of said slides, an actuating connection between said second motor and a fixed support to effect horizontal movement of said slide, a second torque bar, and linkage interconnecting both of said slides to opposite ends of said second torque bar to effect rotation of said torque bar in accordance with horizontal movement of said slide.

5. Adjustable vehicle seat support structure comprising a pair of fore and aft tracks, seat support structure slidable on said tracks, a torque bar extending between said tracks, a first pair of arms pivoted to opposite ends of said bar, a second pair of arms fixed to opposite ends of said bar, stationary supports at opposite sides of said seat support structure, and pivot means connecting one of said pairs of arms to said stationary supports and connecting the other pair of arms to said slidable seat support structure.

References Cited by the Examiner
UNITED STATES PATENTS

| | | |
|---|---|---|
| 2,875,809 | 3/1959 | Ragsdale et al. _____ 297—330 X |
| 2,942,646 | 6/1960 | Himka et al. _____ 297—330 X |
| 2,959,208 | 11/1960 | Tanaka et al. _____ 248—393 |
| 2,961,032 | 11/1960 | Pickles _____ 248—429 |
| 3,066,907 | 12/1960 | Latimer et al. _____ 248—420 |
| 3,167,296 | 1/1965 | Pickles _____ 248—419 |

CLAUDE A. LE ROY, *Primary Examiner.*

R. P. SEITTER, *Assistant Examiner.*